(12) United States Patent
Hashemi

(10) Patent No.: US 11,626,929 B2
(45) Date of Patent: Apr. 11, 2023

(54) OPTICAL PHASED ARRAY RECEIVER ARCHITECTURES

(71) Applicant: University of Southern California, Los Angeles, CA (US)

(72) Inventor: Hossein Hashemi, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 17/571,391

(22) Filed: Jan. 7, 2022

(65) Prior Publication Data

US 2022/0216922 A1 Jul. 7, 2022

Related U.S. Application Data

(60) Provisional application No. 63/134,658, filed on Jan. 7, 2021.

(51) Int. Cl.
*H04B 10/61* (2013.01)
*H04B 10/548* (2013.01)

(52) U.S. Cl.
CPC ......... *H04B 10/615* (2013.01); *H04B 10/548* (2013.01)

(58) Field of Classification Search
CPC ............................. H04B 10/615; H04B 10/548
USPC ........................................................ 398/212
See application file for complete search history.

(56) References Cited

U.S. PATENT DOCUMENTS

| 5,374,935 | A  | * | 12/1994 | Forrest ............... | H01Q 3/2676 |
| | | | | | 342/368 |
| 5,526,170 | A  | * | 6/1996  | Esman ............... | G02B 6/2861 |
| | | | | | 359/332 |
| 8,401,405 | B2 | * | 3/2013  | Barton ............... | H04B 10/801 |
| | | | | | 398/201 |
| 10,598,785 | B2 | * | 3/2020  | Khial ..................... | G01S 17/42 |
| 10,911,142 | B2 | * | 2/2021  | Murakowski .......... | H04B 10/11 |
| 2017/0234984 | A1 | * | 8/2017  | Khial ................... | G01S 7/4817 |
| | | | | | 356/5.1 |
| 2017/0324162 | A1 | * | 11/2017 | Khachaturian .... | H01Q 21/0087 |
| 2018/0039154 | A1 | * | 2/2018  | Hashemi ............... | G02F 1/2955 |
| 2019/0157757 | A1 | * | 5/2019  | Murakowski ....... | H01Q 21/0025 |
| 2019/0391243 | A1 | * | 12/2019 | Nicolaescu ........... | G01S 7/4911 |
| 2020/0072952 | A1 | * | 3/2020  | Kern ..................... | G01S 7/4912 |
| 2020/0158839 | A1 | * | 5/2020  | Lin ........................ | G01C 25/00 |
| 2021/0409120 | A1 | * | 12/2021 | Fatemi ................... | H04B 10/40 |
| 2022/0196814 | A1 | * | 6/2022  | Lin ......................... | G01S 17/58 |

\* cited by examiner

*Primary Examiner* — Abbas H Alagheband
(74) *Attorney, Agent, or Firm* — Nixon Peabody LLP

(57) ABSTRACT

Described herein are optical phased array receivers. In various embodiments, an optical phased array receiver includes a set of antennas, each antenna configured to receive an optical signal; a local oscillator configured to generate one or more optical carrier signals; one or more optical signal combiners coupled to the set of antennas and the local oscillator, the one or more optical signal combiners configured to combine (i) the optical signals received by the antennas and (ii) the optical carrier signal; and one or more photodetectors configured to extract information carried by one or more of the received optical signals into an electrical signal, wherein the extracted information is indicative of a phase and an amplitude of the one or more of the received optical signals.

10 Claims, 19 Drawing Sheets

OPTICAL PHASED ARRAY RECEIVER ARCHITECTURES

CROSS-REFERENCE TO RELATED APPLICATIONS

This application includes a claim of priority under 35 U.S.C. § 119(e) to U.S. provisional patent application No. 63/134,658, filed Jan. 7, 2021, the entirety of which is hereby incorporated by reference.

TECHNICAL FIELD

This disclosure relates to architectures for optical phased array receivers. Optical phased arrays enable applications such as 3D imaging, lidar, and optical communications.

BACKGROUND

Phased Arrays

In 1905, Karl Ferdinand Braun (1909 Physic Nobel Laureate) demonstrated that an array of antennas that are fed by a common signal can transmit a directional electromagnetic signal. By controlling the relative phase of the signal at each antenna element, the direction of the electromagnetic signal can be adjusted. In general, a phased array transmitter consists of an array of spaced antennas fed by a common signal whose phase and amplitude can be varied at each antenna. In a phased array, the radiated electromagnetic beam pattern will be a function of array geometry as well as the relative phases and amplitudes of signals. Radio frequency (RF) phased arrays were matured during the WWII in the context of electronically scanning radars. For decades, RF phased arrays were realized in a modular approach using discrete building blocks such as variable phase shifters and variable amplitude adjusters. The advancement of semiconductor manufacturing and integrated circuits led to the realization of monolithic radiofrequency phased arrays in commercial silicon technologies for commercial applications such as automotive radars and high-speed wireless communications. It should be noted that creation and steering a single narrow electromagnetic beam has been only a special application of RF phased arrays. For instance, in a millimeter-wave base station envisioned for the upcoming 5G wireless standards, it is desirable to create and steer multiple beams, each towards a specific user, concurrently.

FIG. 1 shows a schematic of a phased array consisting of an array of antennas each connected to a variable phase shifter and a variable amplitude adjuster. In some implementations, variable amplitude adjusters may be omitted at the expense of reduced beamforming flexibility. The structure shown in FIG. 1 may be used either as a phased array transmitter or a phased array receiver. In fact, if the variable phase shifter and the variable amplitude adjuster are bidirectional, the structure may be used as a phased array transceiver. The antennas may be placed on a line (linear or 1D array) or on a plane (2D array) with uniform or nonuniform spacing.

Optical Phased Arrays

In the early 1960s, shortly after the invention of laser, it was suggested that the laser optical beam can be steered electronically without mechanically moving parts. For instance, RCA Corp. envisioned such systems for projection TV, optical radar (nowadays called lidar), optical communications, and accurate machining. However, the difficulty to accurately control the relative phases of an optical signal that are emitted from wavelength-spaced apertures had prohibited realization of optical phased arrays for decades. In the meanwhile, optical beam-steering was achieved primarily through mechanical means such as rotating mirrors, and to a lesser degree non-mechanically through liquid crystal optical structures whose transmissive or reflective properties depend on the application of a voltage.

In the 1980s, advancements in materials growth and fabrication technology led into monolithic realization of key photonic and electro-optical components such as distributed feedback (DFB) and distributed Bragg reflector (DBR) lasers, detectors, high-quality-factor resonators, modulators, and arrays of components and sub-systems. The continued advancements in the 1990s led to realizations of semiconductor photonic integrated circuits (PIC) primarily for optical communication applications. While the majority of implementations were based on group III-V compound semiconductors, researchers started to look into realization of photonic devices on a silicon substrate alongside electronic components with an ultimate objective of creating complex silicon electro-optic integrated circuits. Since the 2000s, there has been a rapid growth of silicon photonics research leading to commercial realization of complex silicon opto-electronic transceivers.

Over the past decade, a number of monolithic optical phased arrays with various complexities have been reported. Silicon platform has been the technology of choice for such implementations due to the ability to realize complex electro-optical integrated systems monolithically on a single compact chip. Given that the majority of silicon photonic processes have been optimized for the 1310 nm and 1550 nm wavelength for fiber-optical communication applications, most of the implemented optical phased arrays have been designed to operate the same wavelength. There are optical phased array implementations at other wavelengths including the visible range for applications such as holography, display, and biomedical. It is emphasized that the concepts and claims of this invention do not depend either on the wavelength or the underlying semiconductor technology on which the optical phased array is realized.

FIG. 2 shows a schematic of a 1D optical phased array (OPA) that may be realized monolithically on a semiconductor substrate. In this schematic, variable amplitude adjusters are shown to be variable attenuators since they are bidirectional and enable transmit and receive phased array operation and that they are compatible with today's standard commercial silicon foundries. In a semiconductor process that optical amplification is possible, variable amplitude adjusters might be realized as variable gain amplifiers. In this structure, antennas may be sufficiently close (e.g., half wavelength spacing between adjacent antennas) and routed to variable phase shifters and variable amplitude adjusters, that might occupy larger footprint, using optical waveguides.

FIG. 3 shows a schematic of a 2D optical phased array that may be realized monolithically on a semiconductor substrate. In this schematic, variable amplitude adjusters are shown to be variable attenuators since they are bidirectional and enable transmit and receive phased array operation and that they are compatible with today's standard commercial silicon foundries. In this structure, the variable phase shifters and variable amplitude adjusters are placed local to each antenna element. The size of the antennas, variable phase shifters, and variable amplitude adjusters determine the minimum spacing between adjacent antenna elements.

FIG. 4 shows a schematic of a 2D optical phased array that may be realized monolithically on a semiconductor substrate. In this schematic, variable amplitude adjusters are shown to be variable attenuators since they are bidirectional and enable transmit and receive phased array operation and that they are compatible with today's standard commercial silicon foundries. In this structure, the variable phase shifters and variable amplitude adjusters are placed further away from the antennas. The minimum spacing between adjacent antennas depend on the antenna size and the dimensions and number of optical waveguides that are routed between them.

A system that consists of a transmitter and receiver may be constructed in different ways such as the following:

1. Separate transmitter and separate receiver each with its own antenna(s),
2. Separate transmitter and receiver that share antenna(s), or
3. Transmitter and receiver share many blocks including the antenna(s).

In FIG. 2, FIG. 3, and FIG. 4, the phased array functions as well as the antennas can be shared between the transmitter and receiver. There are cases where it might be preferred to separate the transmitter from the receiver. In these cases, each of the transmitter or receiver might be phased array and each one may adopt a different architecture.

Coherent Systems

The advantages of coherent systems for communication, imaging, ranging, etc. are well established. In a generic coherent system, the transmitted waveform may be represented as $$E_{TX}(t) = a_{TX}(t)\cos(\omega_o t + \phi_{TX}(t)), \quad (1)$$

where $\omega_o$ is the carrier frequency, and $a_{TX}(t)$ and $\emptyset_{TX}(t)$ represent the amplitude and phase modulation signals. A coherent receiver uses a signal that is similar to the carrier, historically referred to as local oscillator (LO) signal, to extract the amplitude and phase information. It should be noted that the amplitude and phase information of the received waveform are different than those of the transmitted waveform. For instance, in the context of imaging and ranging applications, the difference in the received and transmitted phase and/or amplitude waveforms can provide information about the location and velocity of the object(s). The received waveform may be written as $$E_{RX}(t) = a_{RX}(t)\cos(\omega_o t + \phi_{RX}(t)), \quad (2)$$

In one implementation of the coherent receiver, the received waveform is multiplied by quadrature phases (e.g., 0° and 90°) of the local oscillator waveform represented as $$E_{LO,I}(t) = a_{LO}\cos(\omega_o t + \phi_{LO}), \quad (3)$$

$$E_{LO,Q}(t) = a_{LO}\sin(\omega_o t + \phi_{LO}), \quad (4)$$

where $a_{LO}$ is the amplitude of the LO signal and $\emptyset_{LO}$ represents the phase of the LO relative to the received waveform. The results, after lowpass filtering, will be $$E_{RX,I}(t) = \frac{a_{LO}a_{RX}(t)}{2}\cos(\phi_{RX}(t) - \phi_{LO}), \quad (5)$$

$$E_{RX,Q}(t) = \frac{a_{LO}a_{RX}(t)}{2}\sin(\phi_{RX}(t) - \phi_{LO}). \quad (6)$$

The above expressions can be used to extract $a_{RX}(t)$ and $\emptyset_{RX}(t)$ Alternatively, in a coherent receiver, the received signal may be multiplied with the quadrature versions of the transmitted signal which, after lowpass filtering, will result in $$E_{RX,I}(t) = \frac{a_{TX}(t)a_{RX}(t)}{2}\cos(\phi_{RX}(t) - \phi_{TX}(t)), \quad (7)$$

$$E_{RX,Q}(t) = \frac{a_{TX}(t)a_{RX}(t)}{2}\sin(\phi_{RX}(t) - \phi_{TX}(t)). \quad (8)$$

The relative difference between the instantaneous phases of the transmit and receive waveform, $\emptyset_{RX}(t)-\emptyset_{TX}(t)$, that can be extracted from the above, provides information about the location and velocity of the targets in coherent ranging and imaging schemes.

In radiofrequencies, there are a number of approaches to realize the function of multipliers for coherent receivers. For instance, switching mixers are often used.

In optical frequencies, the multiplier function may be realized as a signal combiner that is followed by a photodetector. Specifically, if a received signal of the form (2) is combined with quadrature LO signals of the forms (3) and (4), and fed to a pair of photodetectors, the photodetectors' currents will be $$I_{PD,I}(t) = R_{PD}\left[\frac{a_{RX}(t)^2}{2} + \frac{a_{LO}^2}{2} + a_{LO}a_{RX}(t)\cos(\phi_{RX}(t) + \phi_{LO})\right], \quad (9)$$

$$I_{PD,Q}(t) = R_{PD}\left[\frac{a_{RX}(t)^2}{2} + \frac{a_{LO}^2}{2} + a_{LO}a_{RX}(t)\sin(\phi_{RX}(t) + \phi_{LO})\right], \quad (10)$$

where $R_{PD}$ is the responsivity of the photodetector. In a differential or balanced implementation, the photodetector currents may be further simplified to $$I_{PD,I}(t) = R_{PD}a_{LO}a_{RX}(t)\cos(\phi_{RX}(t) + \phi_{LO}), \quad (11)$$

$$I_{PD,Q}(t) = R_{PD}a_{LO}a_{RX}(t)\sin(\phi_{RX}(t) + \phi_{LO}), \quad (12)$$

which may be used to extract the information of received amplitude $a_{RX}(t)$ and phase $\emptyset_{RX}(t)$.

SUMMARY

Disclosed herein are optical phased array receivers. In various embodiments, an optical phased array receiver includes: a set of antennas, each antenna configured to receive an optical signal; a local oscillator configured to generate an optical carrier signal; one or more optical signal combiners coupled to the set of antennas and the local oscillator, the one or more optical signal combiners configured to combine (i) the optical signals received by the antennas and (ii) the optical carrier signal; and one or more photodetectors configured to extract information carried by one or more of the received optical signals into an electrical signal. The extracted information is indicative of a phase and an amplitude of the one or more of the received optical signals.

In some embodiments, the optical phased array receiver further includes: a set of optical variable phase shifters, each optical variable phase shifter configured to adjust the phase of the one or more of the received optical signals; and a set of optical variable amplitude adjusters, each optical variable amplitude adjuster configured to adjust the amplitude of the one or more of the received optical signals. In some embodiments, the one or more optical signal combiners includes a first optical signal combiner configured to combine the phase- and amplitude-adjusted received optical signals into a combined received optical signal; and a second optical signal combiner configured to combine the combined received optical signal and the optical carrier signal. In some embodiments, the one or more photodetectors include a photodetector coupled to the second optical signal combiner and configured to generate an electrical signal that is indicative of a phase and an amplitude of one or more of the received optical signals.

In some embodiments, the optical phased array receiver further includes an analog to digital converter configured to convert the analog electrical signal to a digital signal; and a digital signal processor configured to process the digital signal. In some embodiments, the optical phased array receiver further includes smaller subarrays, wherein each subarray includes a set of antennas, a set of optical variable phase shifters, a set of optical variable amplitude adjusters, a signal combiner configured to combine the phase- and amplitude-adjusted received optical signals within the subarray into a combined received optical signal, and a photodetector configured to generate an electrical signal that is indicative of a phase and an amplitude of one or more received optical signals in the corresponding subarray; and a signal splitter configured to split the optical carrier signal into one or more optical carrier signals to be coupled to each of the subarrays.

In some embodiments, the optical phased array receiver further includes: an optical signal splitter configured to split the optical carrier signal into a plurality of optical carrier signals; and a set of optical variable phase shifters, each optical variable phase shifter configured to adjust either the phase of a corresponding one of the plurality of optical carrier signals or the phase of a corresponding received optical signal. In some embodiments, each of the optical signal combiners is configured to combine: the (i) phase-adjusted optical carrier signal and (ii) corresponding received optical signal; or the (i) phase-adjusted received optical signal and (ii) corresponding optical carrier signal; or the (i) phase-adjusted received optical signal and (ii) corresponding phase-adjusted optical carrier signal.

In some embodiments, the optical phased array receiver further includes an analog to digital converter configured to convert the amplified signal to a digital signal; and a digital signal processor configured to process the digital signal. In some embodiments, the optical phased array receiver further includes one or more variable amplitude adjusters, and each variable amplitude adjuster is configured to adjust the amplitude of a received optical signal or an optical carrier signal or a combined optical signal.

In other embodiments, the optical phased array receiver is divided into smaller subarrays, each subarray including a set of antennas, a set of optical variable phase shifters, a set of photodetectors, and an analog to digital converter.

In some embodiments, the optical phased array receiver further includes an optical signal splitter coupled to the local oscillator and configured to split the optical carrier signal into a plurality of optical carrier signals. Each of the optical signal combiners, coupled to the optical signal splitter and a corresponding one of the set of antennas, is configured to combine (i) one of the plurality of optical carrier signals and (ii) the optical signal received by the corresponding one of the antennas. Each of the photodetectors coupled to a corresponding one of the optical signal combiners is configured to extract the information carried by the one or more received optical carrier signals into an electrical signal. The optical phased array receiver further includes one or more analog to digital converters configured to convert the analog electrical signals into one or more digital signals, the one or more digital signals being indicative of the phase and the amplitude of one or more received optical signals.

In some embodiments, the optical phased array receiver further includes a set of electrical variable phase shifters, wherein each electrical variable phase shifter is configured to adjust a phase of an electrical signal that corresponds to a photodetector prior to the analog to digital conversion.

In other embodiments, the optical phased array receiver is divided into smaller subarrays, each subarray including a set of antennas coupled to the optical signal splitter coupled to the local oscillator, a set of electrical variable phase shifters, one or more photodetectors, and an analog to digital converter.

In other embodiments, the optical phased array receiver is divided into smaller subarrays, each subarray including a set of antennas coupled to the optical signal splitter coupled to the local oscillator, one or more photodetectors, and an analog to digital converter.

The details of one or more embodiments of the invention are set forth in the accompanying drawings and the description below. Other features, objects, and advantages of the invention will be apparent from the description and drawings, and from the claims.

DETAILED DESCRIPTION

All references cited herein are incorporated by reference in their entirety as though fully set forth. Unless defined otherwise, technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Indeed, the present invention is in no way limited to the methods and materials described. For purposes of the present invention, the following terms are defined below.

The architectures introduced here do not depend on the operation wavelength or the semiconductor technology on which the systems are implemented. The architectures are applicable to 1D and 2D optical phased arrays, and do not depend on the spacing between adjacent antennas or the total number of antennas.

Optical Phased Array Receiver Architectures

The majority of reported optical phased arrays have been demonstrated in the transmitting mode. In the context of coherent receiver, a few different architectures of the receiving optical phased array may be envisioned.

Figure 1:
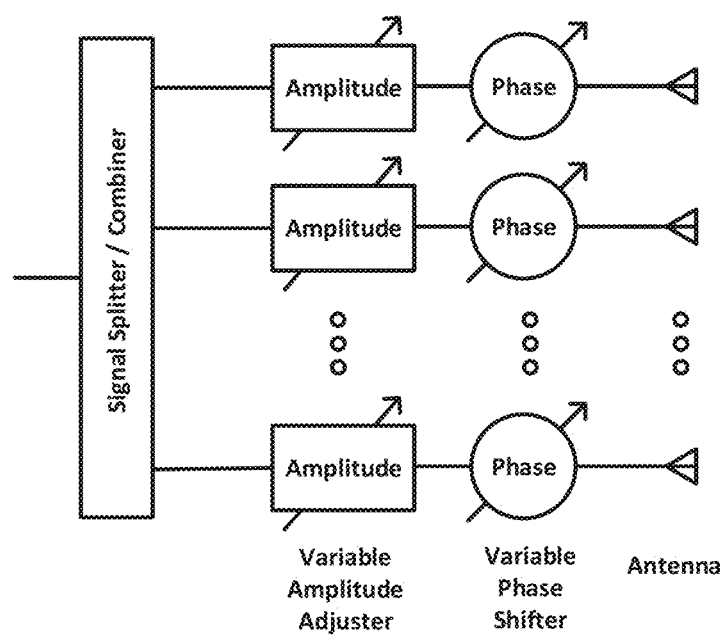
FIG. 1 shows a schematic of a phased array including an array of antennas, each connected to a variable phase shifter and a variable amplitude adjuster.
Figure 2:
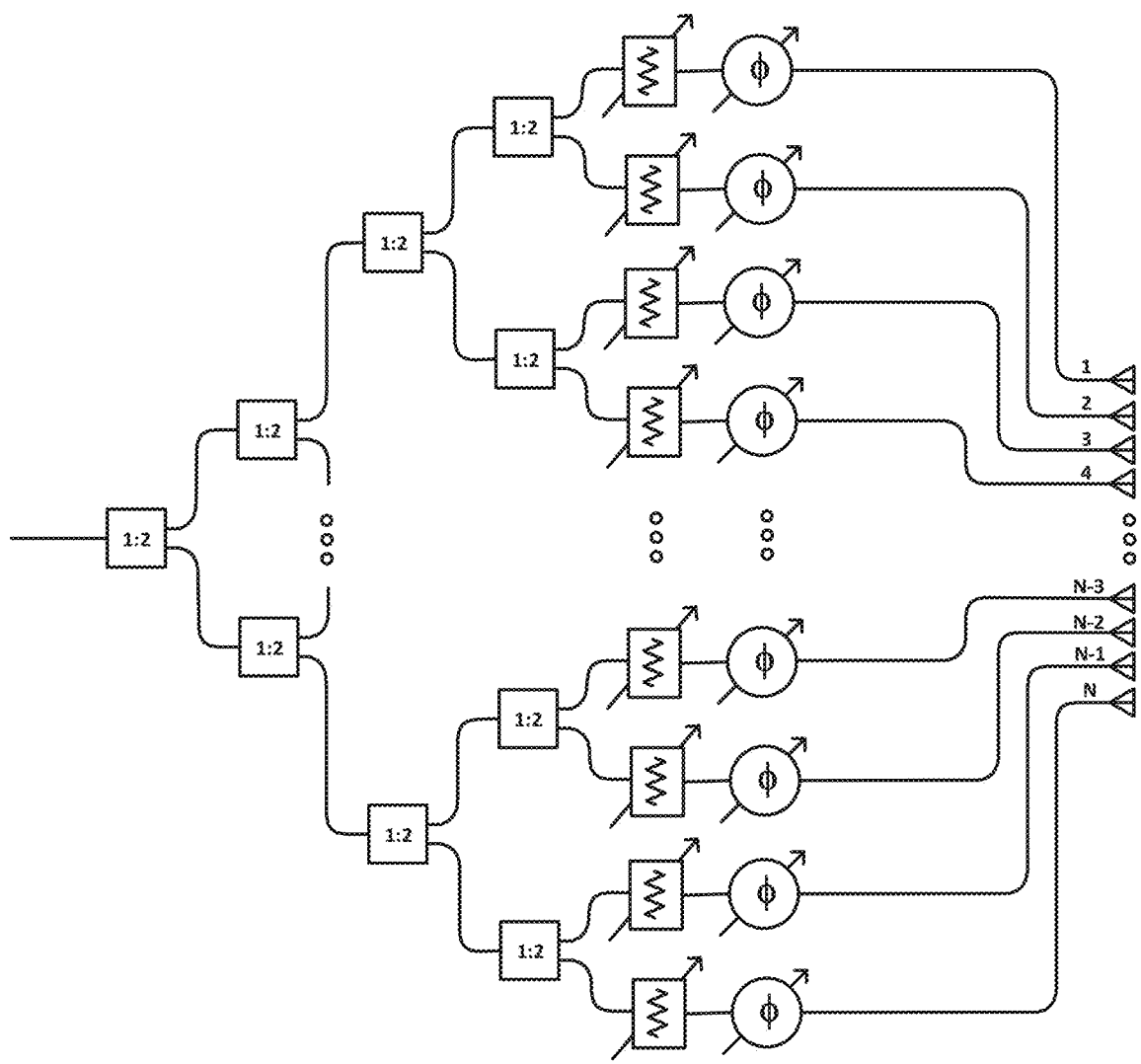
FIG. 2 shows a schematic of a 1D optical phased array.
Figure 3:
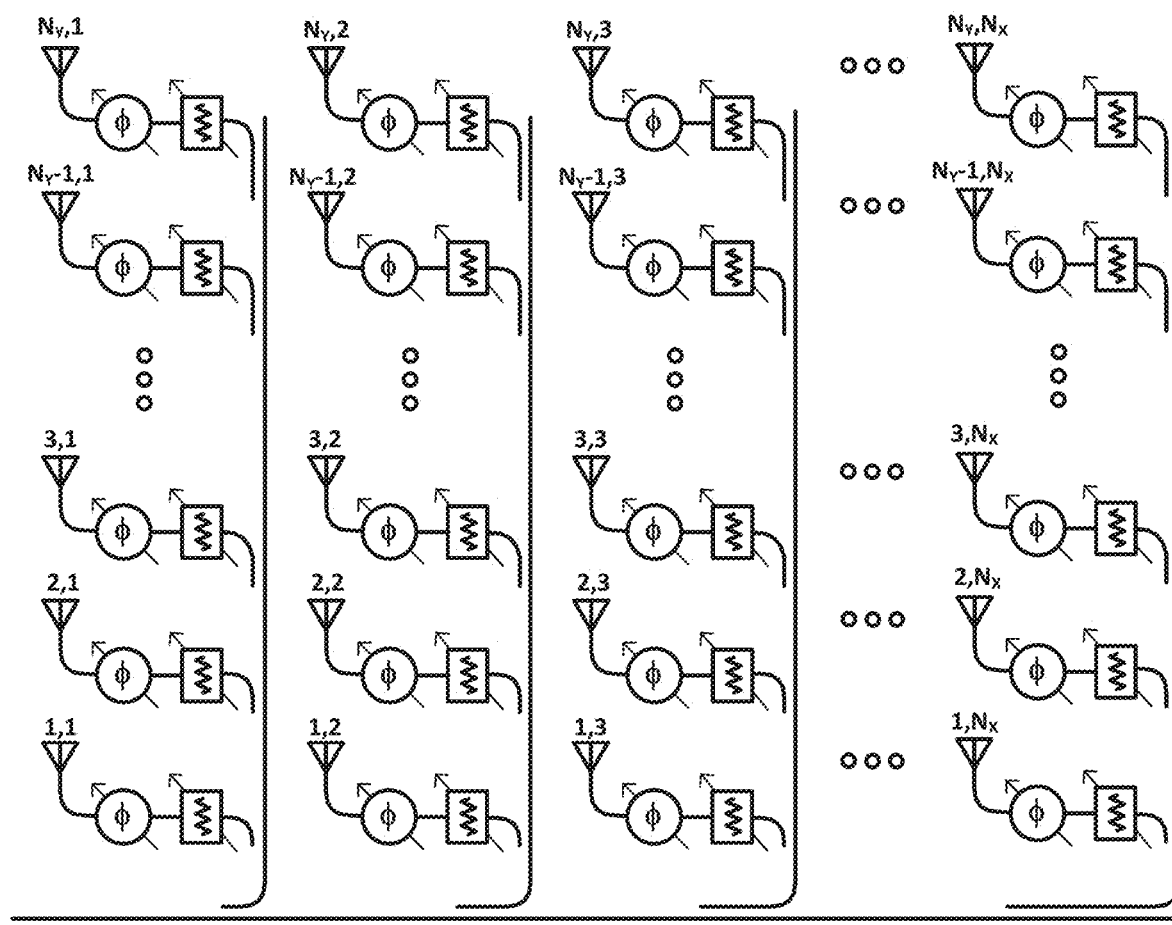
FIG. 3 shows a schematic of a 2D optical phased array.
Figure 4:
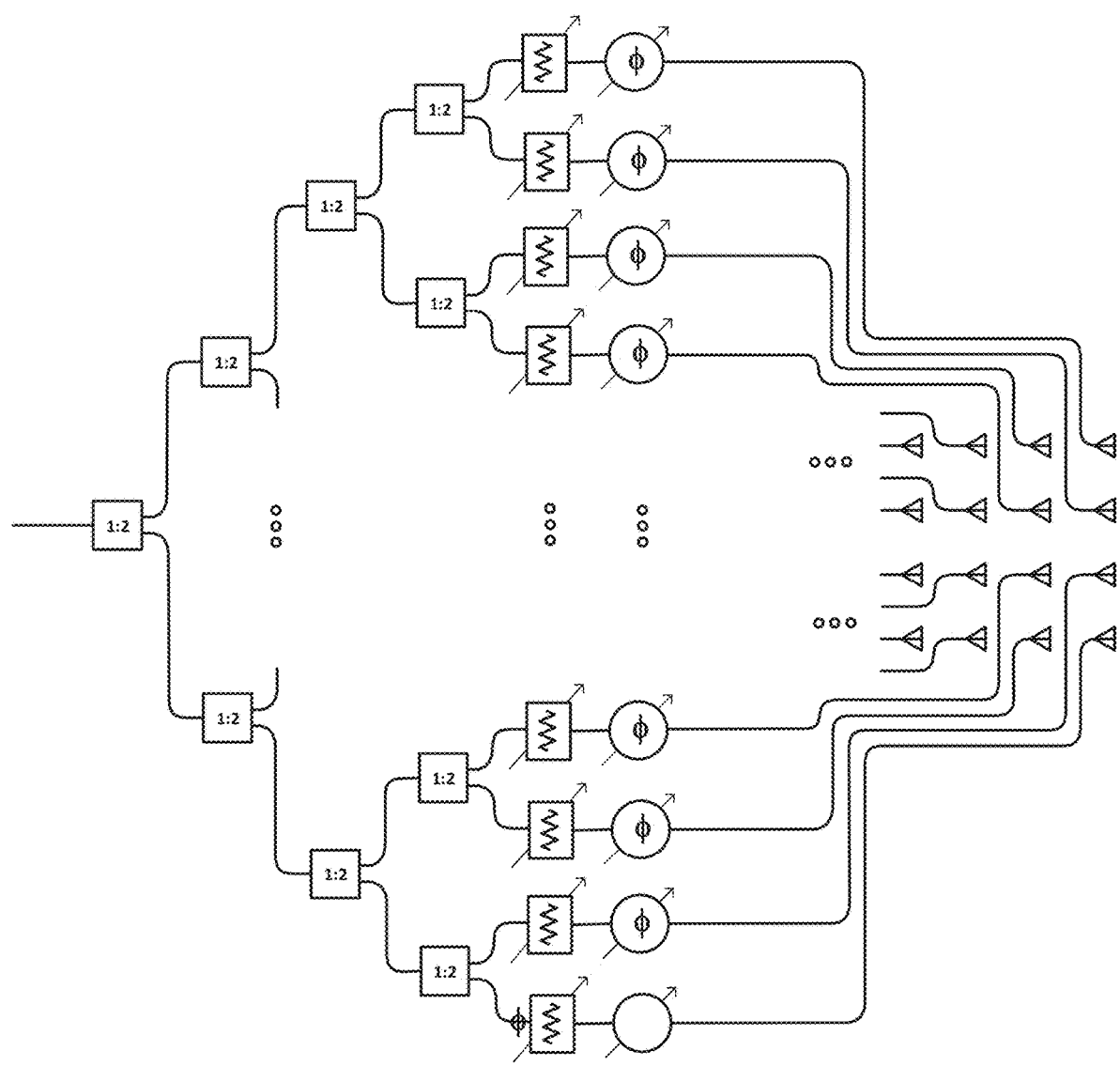
FIG. 4 shows a schematic of a 2D optical phased array.
Figure 5:
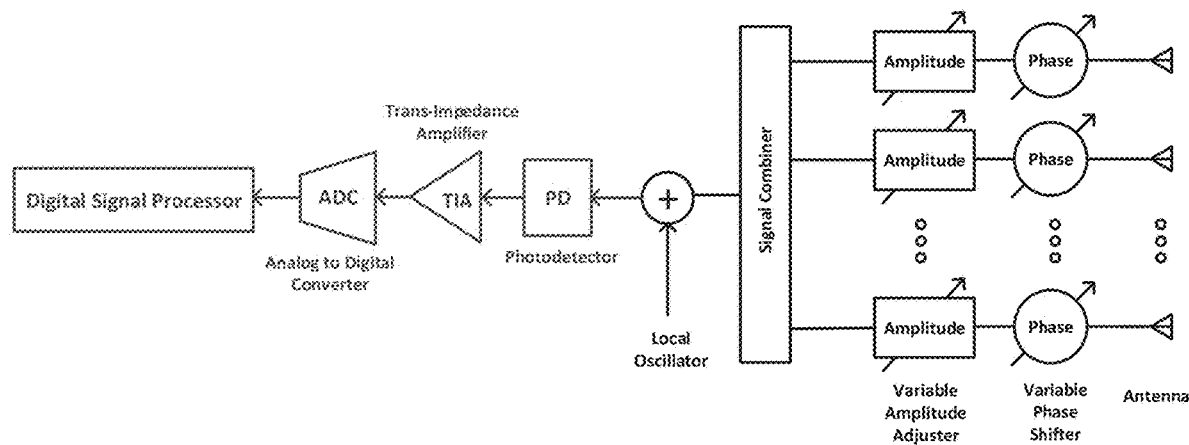
FIG. 5 shows a schematic of a coherent optical phased array receiver architecture according to an embodiment of the present disclosure.

FIG. 5 shows a schematic of a coherent optical phased array receiver architecture. In this scheme, variable phase shifters and variable amplitude adjustors adjust the phase and amplitude of optical signals received by the antennas. A signal combiner combines these adjusted optical signals into a single combined optical signal. An additional signal combiner combines this combined optical signal with an optical carrier signal generated by a local oscillator (LO), to generate a modulated optical carrier signal. A photodetector detects the modulated optical carrier signal and converts it into a current signal that is indicative of the phase and amplitude of each optical signal received by the antennas. Further, a trans-impedance amplifier (TIA) converts the current signal into a voltage signal, which is then converted to a digital signal by an analog to digital converter (ADC). Finally, a digital signal processor (DSP) analyzes the digital signal to determine the phase and the amplitude of the optical signal received by each of the antennas. This scheme may be referred to as signal path beamforming in the optical domain.

Figure 6:
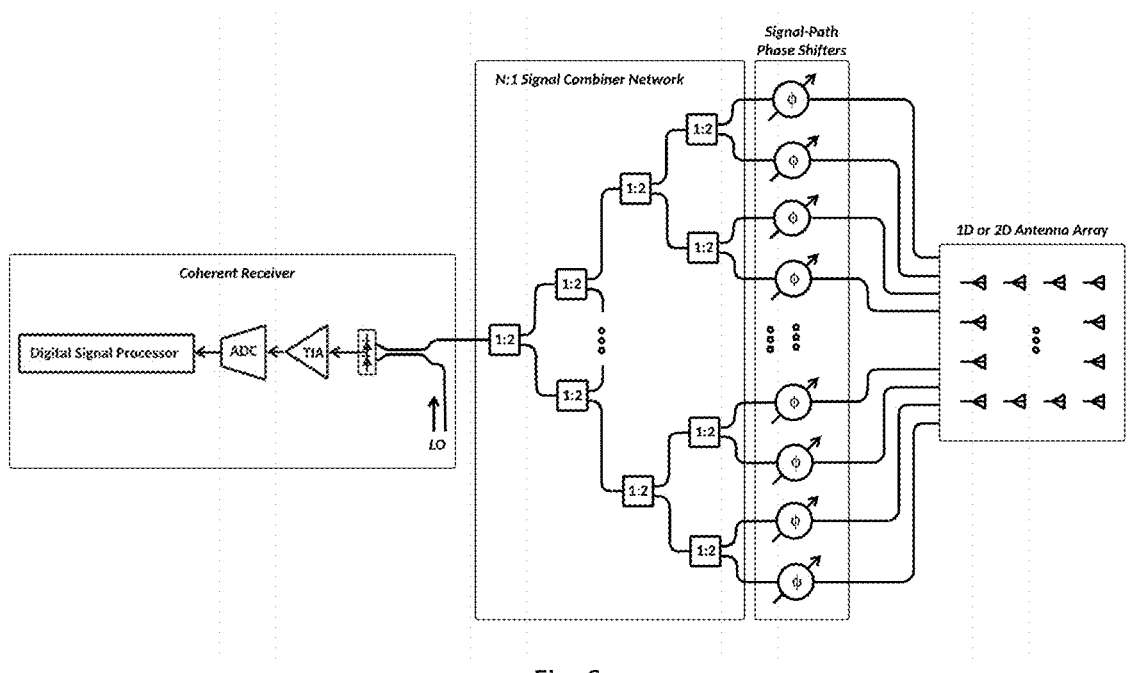
FIG. 6 shows a schematic of a coherent optical phased array receiver following the scheme of FIG. 5 according to an embodiment of the present disclosure.

As an exemplary embodiment, FIG. 6 shows the schematic of one possible realization of a coherent optical phased array receiver following the scheme of FIG. 5 where only variable phase shifters are used and the signal combiner consists of a binary-tree array of 1:2 signal combiners, and balanced photodetectors are shown. As shown in FIG. 6, this scheme mimics that of a generic transmitting optical phased array where variable optical phase shifters are placed in the signal path following each antenna, and coherent detection is performed on the combined optical signal.

Figure 7:
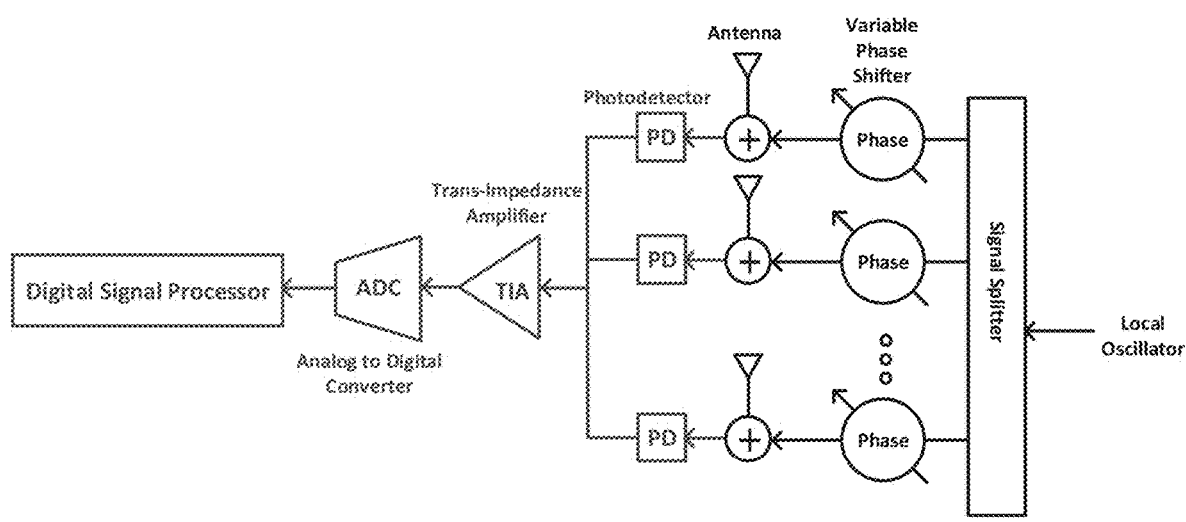
FIG. 7 shows a schematic of a coherent optical phased array receiver according to an embodiment of the present disclosure.

FIG. 7 shows a schematic of an alternative optical phased array receiver architecture. In this scheme, variable phase shifters are placed in the path of a local oscillator (LO), and the signal combining is performed in the electrical domain (e.g., by adding the currents of photodetectors). In this scheme, the LO generates an optical carrier signal and an optical signal splitter coupled to the LO splits the optical carrier signal into a plurality of optical carrier signals. A set of variable phase shifters are coupled to the optical signal splitter, and each variable phase shifter adjusts a phase of a corresponding one of the plurality of optical carrier signals. Among a set of antennas, each antenna receives an optical signal. Among a set of optical signal combiners, each optical signal combiner is coupled to a corresponding one of the antennas and a corresponding one of the variable phase shifters, each optical signal combiner combining (i) the phase-adjusted optical carrier signal generated by the corresponding one of the variable phase shifters and (ii) the optical signal received by the corresponding one of the antennas, into a modulated optical carrier signal. Among a set of photodetectors, each photodetector is coupled to a corresponding one of the optical signal combiners, detects the modulated optical carrier signal of the corresponding one of the optical signal combiners, and generates an electrical signal. Further, a trans-impedance amplifier (TIA) converts the electrical signal into a voltage signal, which is then converted to a digital signal by an analog to digital converter (ADC). Finally, a digital signal processor (DSP) analyzes the digital signal to determine the phase and the amplitude of the optical signal received by each of the antennas. This scheme may be referred to as local oscillator beamforming in the optical domain.

Figure 8:
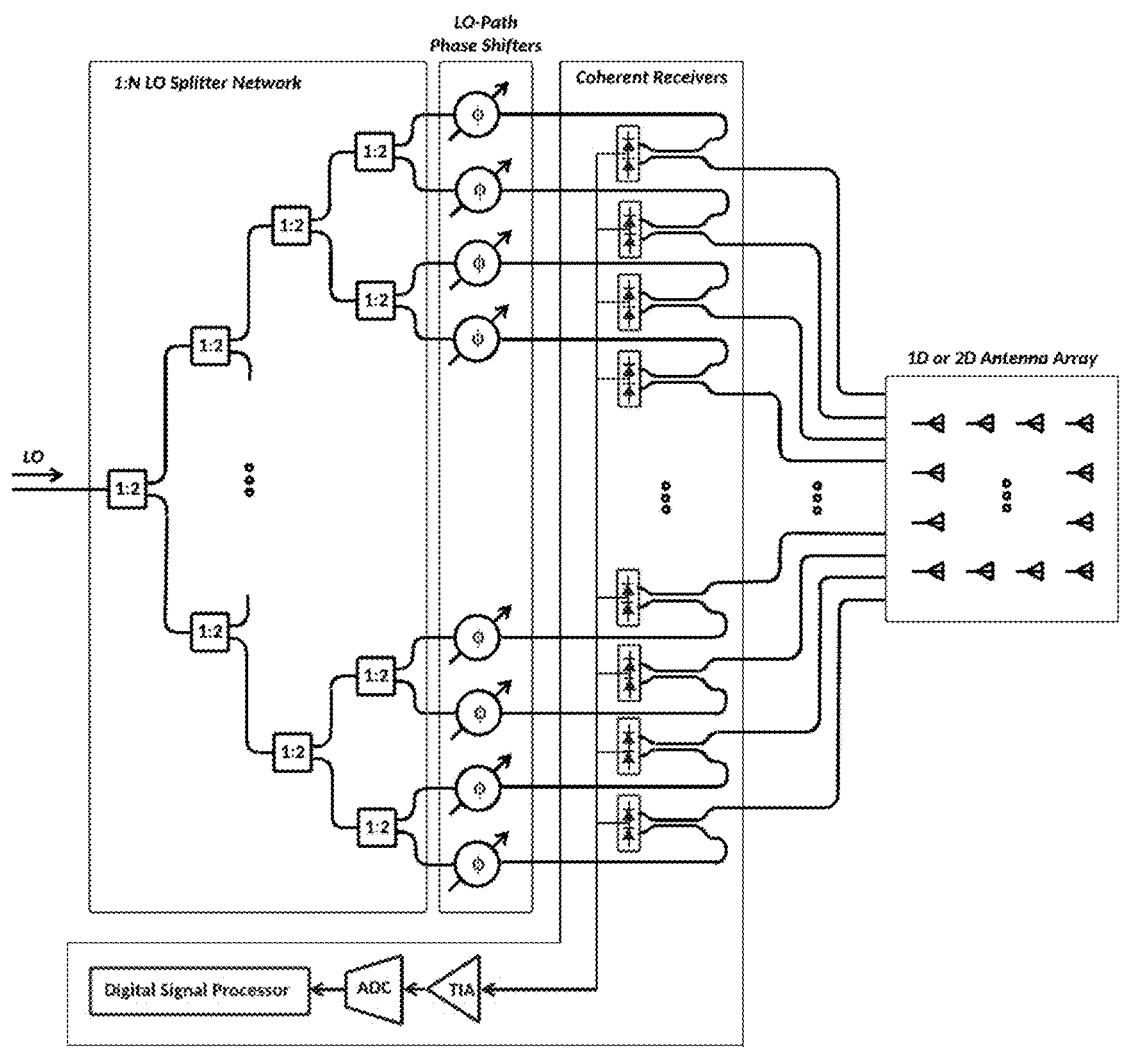
FIG. 8 shows a schematic of a coherent optical phased array receiver following the scheme of FIG. 7 according to an embodiment of the present disclosure.

As an exemplary embodiment, FIG. 8 shows the schematic of one possible realization of a coherent optical phased array receiver following the scheme of FIG. 7 where the signal splitter in the LO path consists of a binary-tree array of 1:2 signal combiners, and balanced photodetectors are shown. In this scheme, as shown in FIG. 8, the variable phase shifters are placed in the local oscillator (LO) path corresponding to the received signal from each antenna, and the signal combining is performed in the electrical domain.

Figure 9:
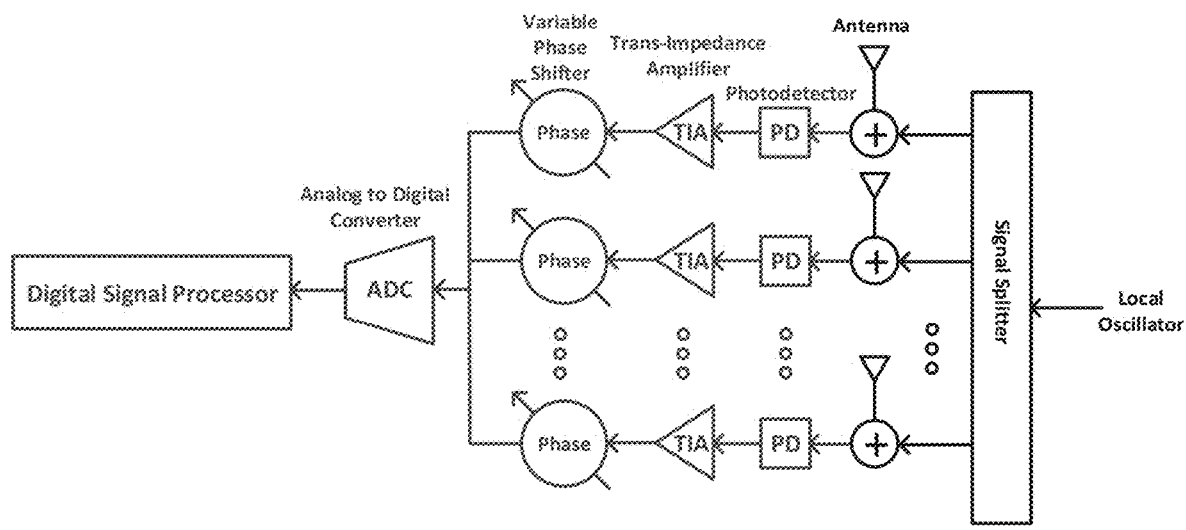
FIG. 9 shows a schematic of a coherent optical phased array receiver according to an embodiment of the present disclosure.

FIG. 9 shows a schematic of an alternative optical phased array receiver architecture. In this scheme, variable phase shifters are placed in the electrical domain following coherent detection. There is a plethora of active and passive approaches to realize electrical variable phase shifters. In this scheme, a local oscillator generates an optical carrier signal and an optical signal splitter coupled to the local oscillator splits the optical carrier signal into a plurality of optical carrier signals. Each of a set of antennas receives an optical signal. Among a set of optical signal combiners, each optical signal combiner is coupled to the optical signal splitter and a corresponding one of the set of antennas, each optical signal combiner combining (i) one of the plurality of optical carrier signals and (ii) the optical signal received by the corresponding one of the antennas, into a modulated optical carrier signal. Among a set of photodetectors, each photodetector is coupled to a corresponding one of the set of optical signal combiners, detects the modulated optical carrier signals of the corresponding one of the optical signal combiners, and generates a current signal that is indicative of a phase and an amplitude of the optical signal received by a corresponding one of the antennas.

Further, among a set of trans-impedance amplifiers, each trans-impedance amplifier is coupled to a corresponding one of the photodetectors and converts the current signal of the corresponding one of the photodetectors into a voltage signal. Furthermore, among a set of variable phase shifters, each variable phase shifter is coupled to a corresponding one of the trans-impedance amplifiers and adjusts a phase of the voltage signal of the corresponding one of the trans-impedance amplifiers. An analog to digital converter coupled to each variable phase shifter converts the phase-shifted voltage signals into a digital signal, the digital signal being indicative of the phase and the amplitude of each optical signal received by the set of antennas. A digital signal processor processes the digital signal, analyzing the digital signal to determine the phase and the amplitude of the optical signal received by each of the antennas. This scheme may be referred to as signal path beamforming in the electrical domain.

Figure 10:
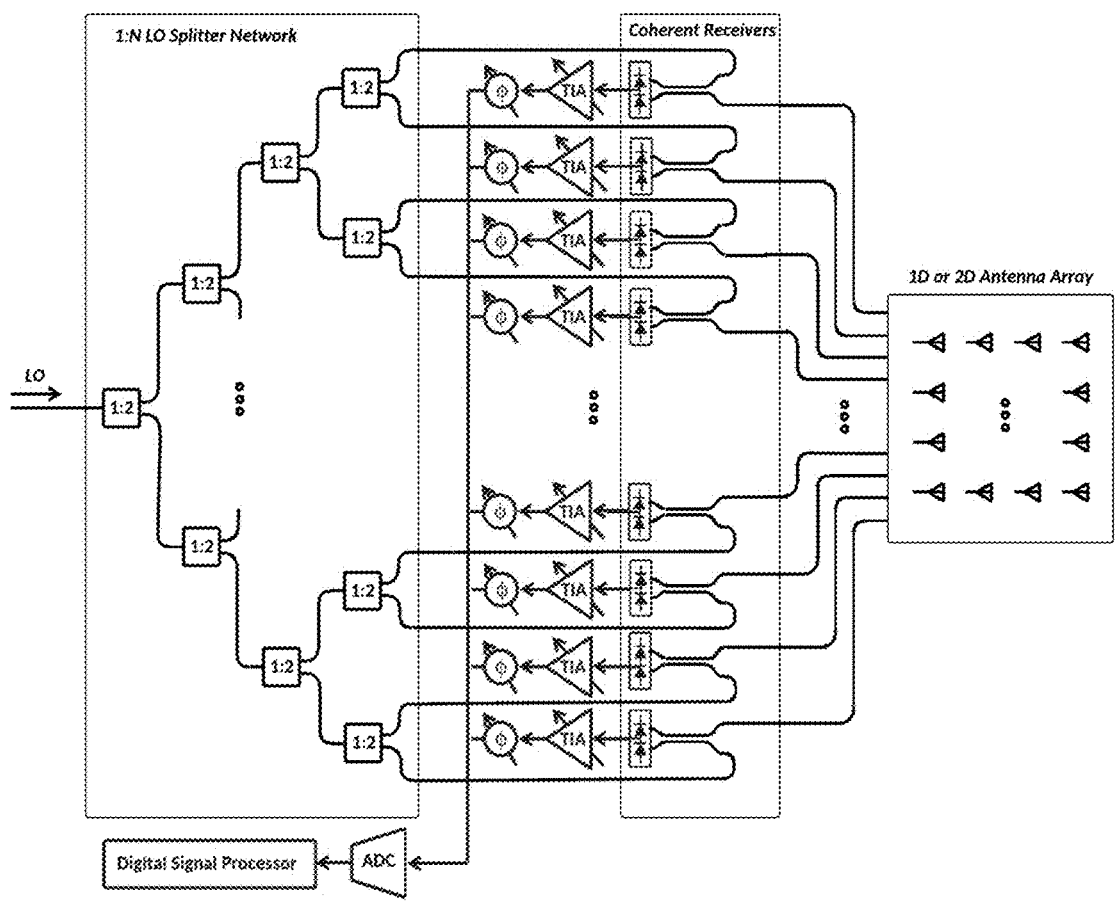
FIG. 10 shows a schematic of a coherent optical phased array receiver following the scheme of FIG. 9 according to an embodiment of the present disclosure.

As an exemplary embodiment, FIG. 10 shows the schematic of one possible realization of a coherent optical phased array receiver following the scheme of FIG. 9 where the signal splitter in the LO path consists of a binary-tree array of 1:2 signal combiners, and balanced photodetectors are shown. As shown in FIG. 10, in this scheme, phase shifting is performed in the electronic domain following the photodetectors and trans-impedance amplifiers, and signal combining follows the variable phase shifters in the electrical domain. Compared with the previous schemes, this approach does not suffer from the loss and footprint of variable optical phase shifters. However, this scheme requires compact wideband electronic phase shifters.

Figure 11:
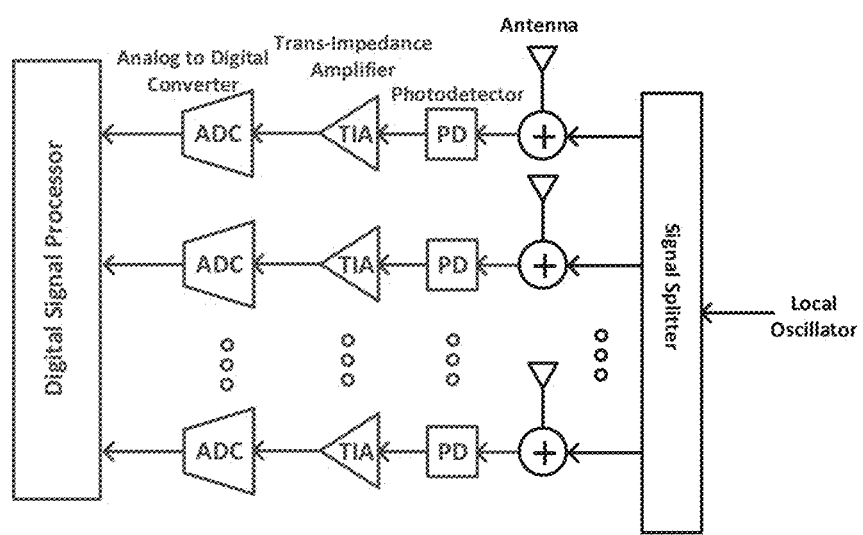
FIG. 11 shows a schematic of a digital coherent optical phased array receiver according to an embodiment of the present disclosure.

FIG. 11 shows a schematic of an alternative optical phased array receiver architecture. In this scheme, beamforming is performed digitally after having an independent coherent receiver for each antenna. The main advantage of such a fully-digital optical phased array receiver, over all previous schemes, is that it enables concurrent reception of independent optical signals from different directions. The main challenges associated with this scheme is compact energy-efficient realization of wideband analog-to-digital converters, and the large amount of digital data that must be processed. In this scheme, a local oscillator generates an optical carrier signal and an optical signal splitter coupled to the local oscillator splits the optical carrier signal into a plurality of optical carrier signals. Each of a set of antennas receives an optical signal. Among a set of optical signal combiners, each optical signal combiner is coupled to the optical signal splitter and a corresponding one of the set of antennas, each optical signal combiner combining (i) one of the plurality of optical carrier signals and (ii) the optical signal received by the corresponding one of the antennas, into a modulated optical carrier signal. Among a set of photodetectors, each photodetector is coupled to a corresponding one of the set of optical signal combiners, detects the modulated optical carrier signal of the corresponding one of the optical signal combiners, and generates a current signal that is indicative of a phase and an amplitude of the optical signal received by a corresponding one of the antennas.

Further, among a set of trans-impedance amplifiers, each trans-impedance amplifier is coupled to a corresponding one of the photodetectors and converts the current signal of the corresponding one of the photodetectors into a voltage signal. Furthermore, among a set of analog to digital converters, each analog to digital converter is coupled to a corresponding one of the trans-impedance amplifiers, converts the voltage signal of the corresponding one of the trans-impedance amplifiers into a digital signal, the digital signal being indicative of the phase and the amplitude of each optical signal received by the set of antennas. A digital signal processor processes the digital signal, analyzing the digital signal to determine the phase and the amplitude of the optical signal received by each of the antennas.

Figure 12:
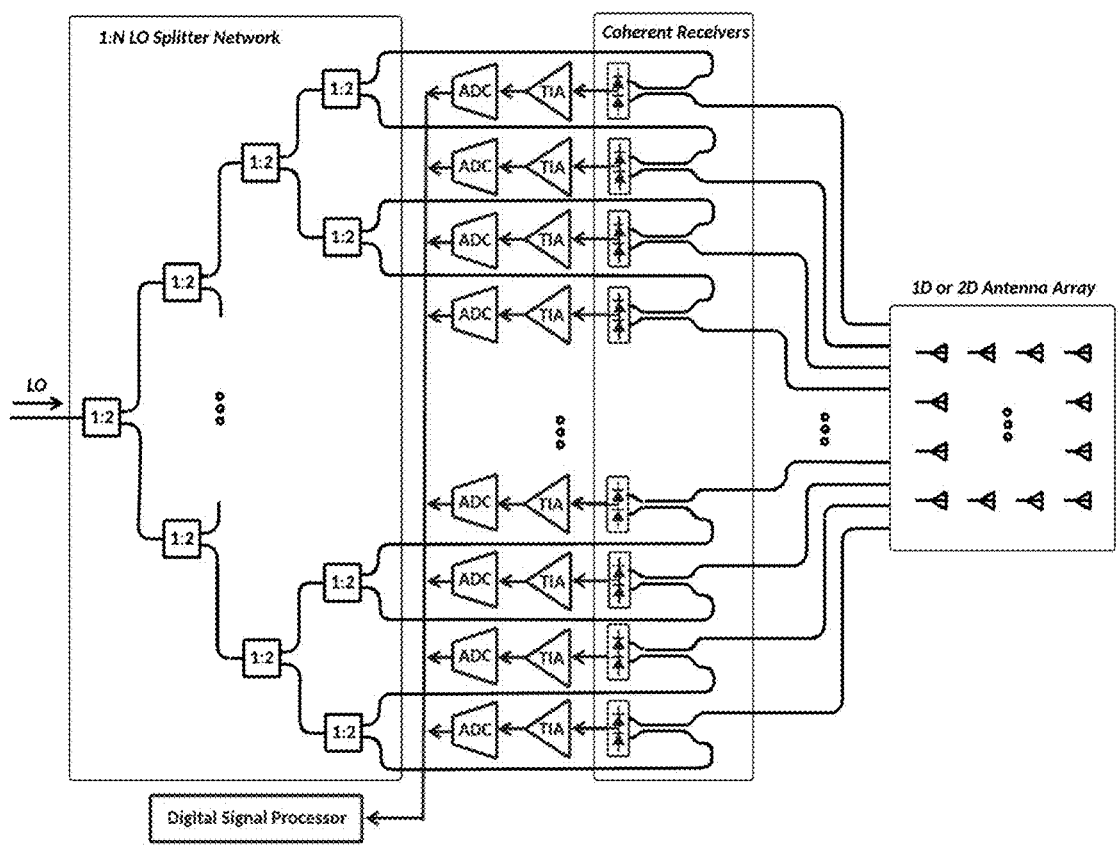
FIG. 12 shows a schematic of a coherent optical phased array receiver following the scheme of FIG. 11 according to an embodiment of the present disclosure.

As an exemplary embodiment, FIG. 12 shows the schematic of one possible realization of a coherent optical phased array receiver following the scheme of FIG. 11 where the signal splitter in the LO path consists of a binary-tree array of 1:2 signal combiners, and balanced photodetectors are shown. As shown in FIG. 12, in this scheme, the received signal from each antenna passes through an independent coherent receiver, and beamforming is performed digitally. The main advantage of such a fully-digital optical phased array receiver, over all previous schemes, is that it enables concurrent reception of independent optical signals from different directions. The main challenges associated with this scheme is compact energy-efficient realization of wideband analog-to-digital converters, and the large amount of digital data that must be processed.

A phased array may be broken down to smaller subarrays. The architecture of each subarray may follow any of the aforementioned architectures.

Figure 13:
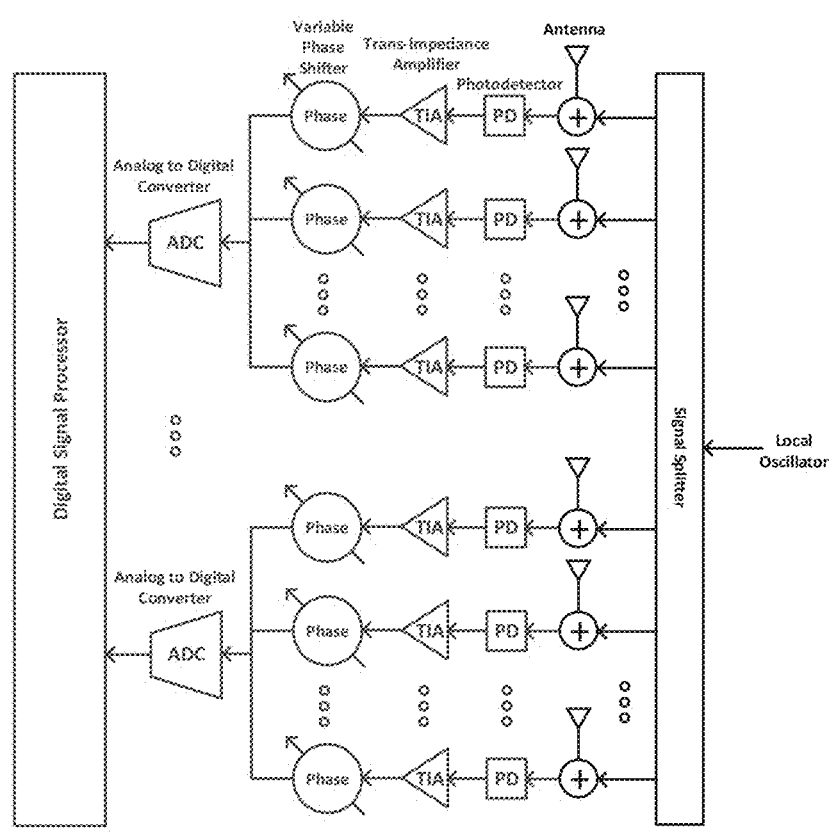
FIG. 13 shows a schematic of a hybrid coherent optical phased array receiver according to an embodiment of the present disclosure.

FIG. 13 shows a schematic of an alternative hybrid optical phased array receiver architecture. In this hybrid scheme, the phased array is divided into smaller subarrays where within a subarray the scheme of FIG. 9 is used and across the subarrays the scheme of FIG. 11 is used. This hybrid scheme offers a tradeoff between beamforming capability and size, footprint, and cost of electronic components. Furthermore, subarray implementation of an optical phased array provides a scalable solution and facilitates systematic array calibration.

Figure 14:
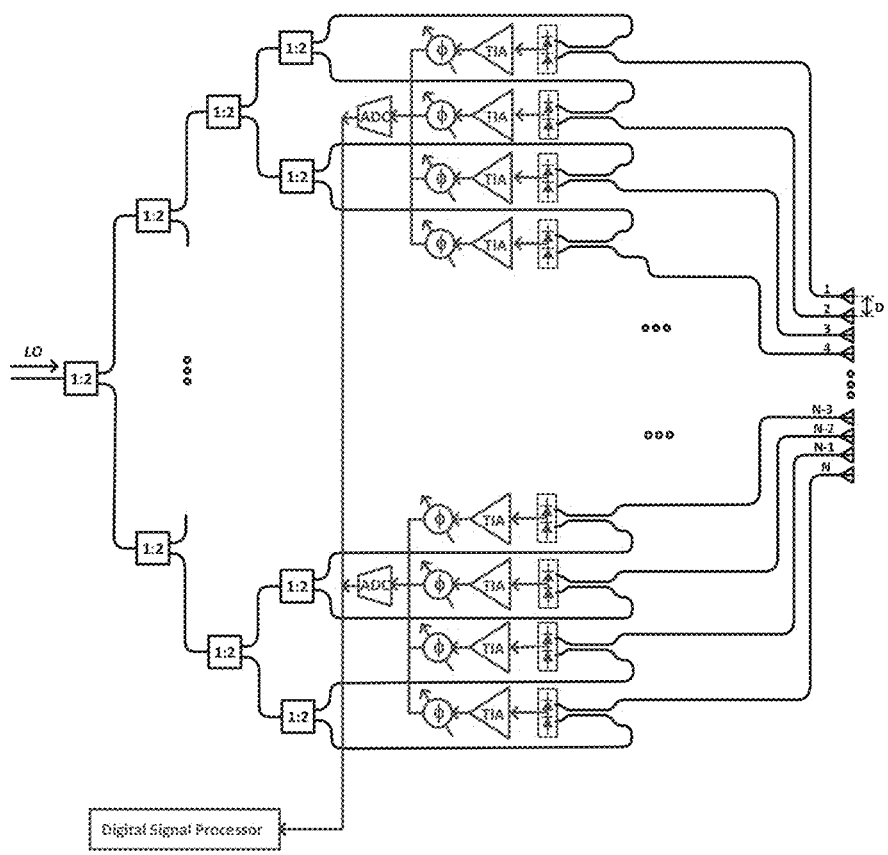
FIG. 14 shows a schematic of a coherent optical phased array receiver following the scheme of FIG. 13 according to an embodiment of the present disclosure.

The aforementioned tradeoff between the beamforming capability and the implementation challenges of the digital scheme may be remedied in a hybrid scheme exemplified in FIG. 14.

FIG. 14 shows the schematic of one possible realization of a coherent optical phased array receiver following the scheme of FIG. 13 where the signal splitter in the LO path consists of a binary-tree array of 1:2 signal combiners, and balanced photodetectors are shown.

Figure 15:
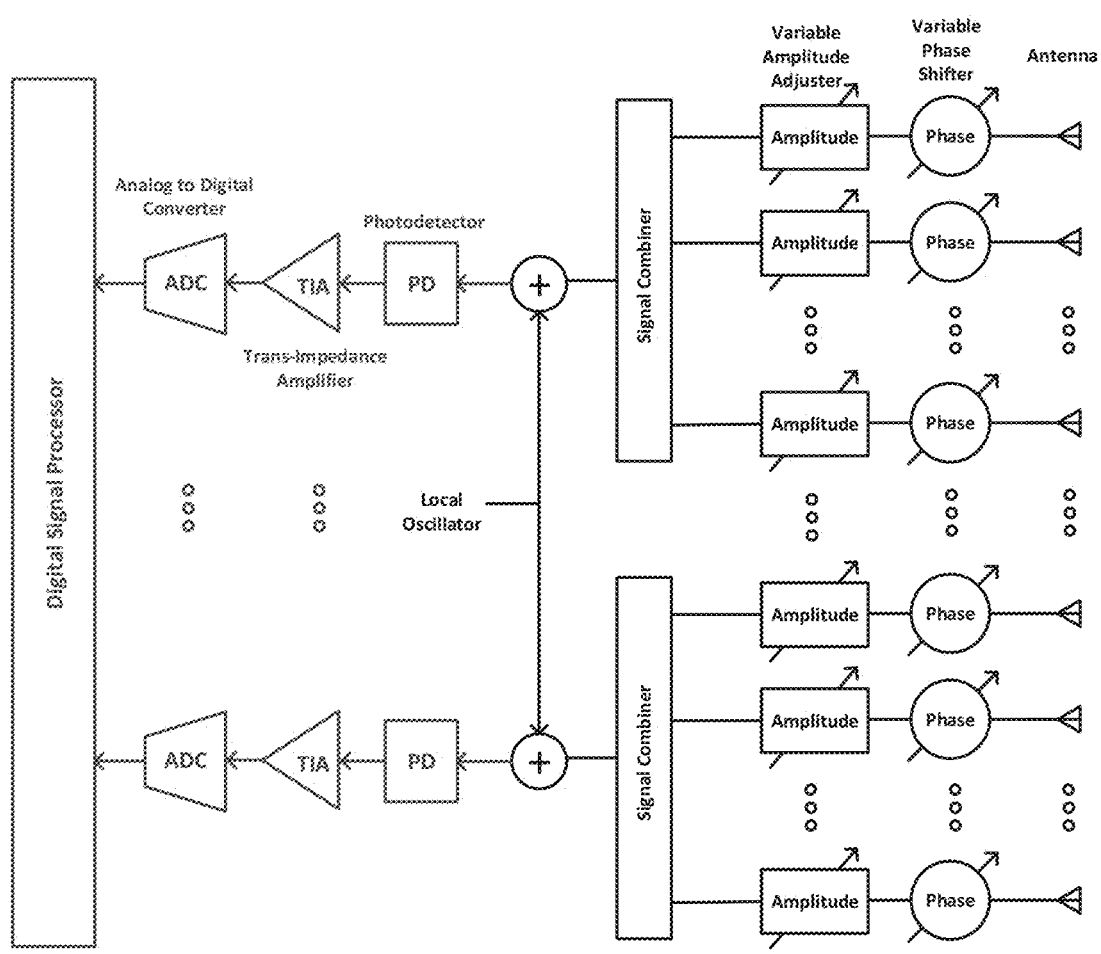
FIG. 15 shows a schematic of a hybrid coherent optical phased array receiver according to an embodiment of the present disclosure.

FIG. 15 shows a schematic of an alternative hybrid optical phased array receiver architecture. In this hybrid scheme, the phased array is divided into smaller subarrays where within each subarray the scheme of FIG. 5 is used and across the subarrays the scheme of FIG. 11 is used. This hybrid scheme offers a tradeoff between beamforming capability and size, footprint, and cost of electronic components. Furthermore, subarray implementation of an optical phased array provides a scalable solution and facilitates systematic array calibration.

Figure 16:
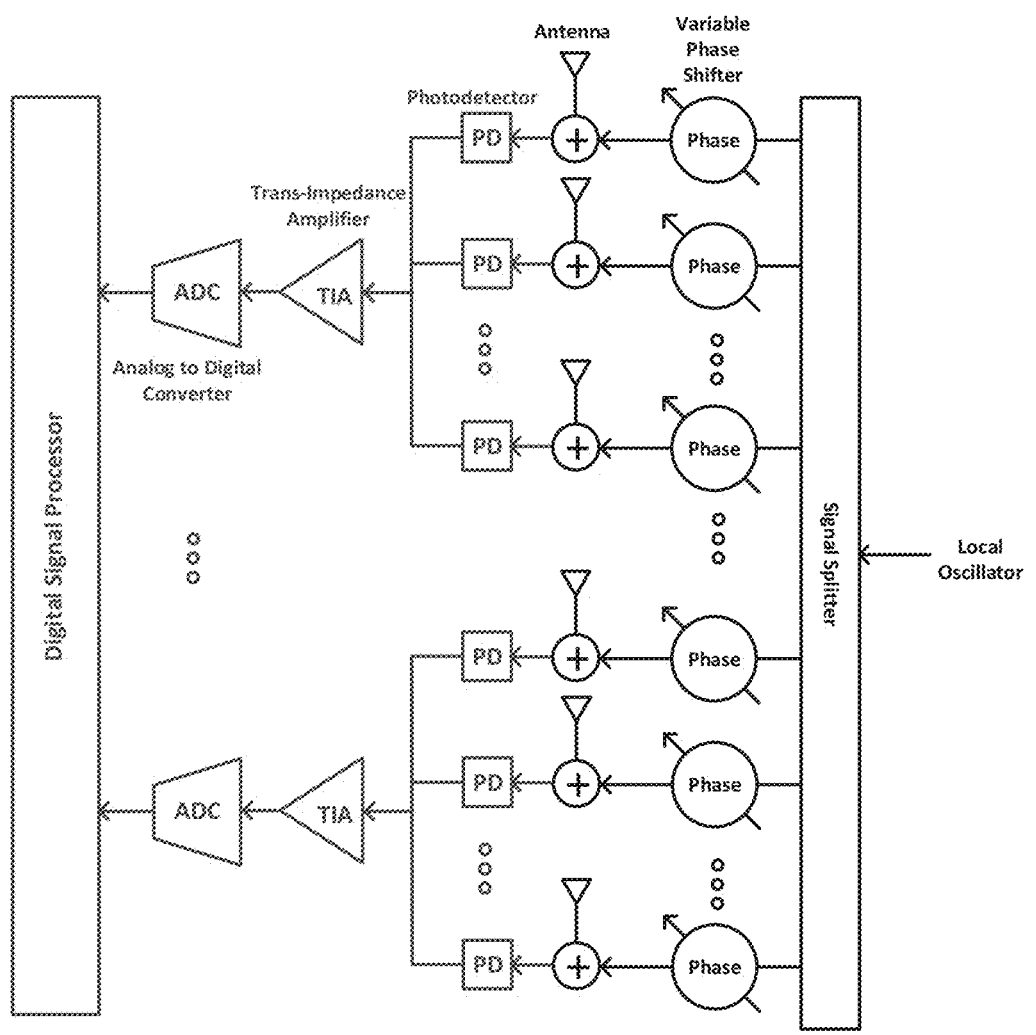
FIG. 16 shows a schematic of a hybrid coherent optical phased array receiver according to an embodiment of the present disclosure.

FIG. 16 shows a schematic of an alternative hybrid optical phased array receiver architecture. In this hybrid scheme, the phased array is divided into smaller subarrays where within each subarray the scheme of FIG. 7 is used and across the subarrays the scheme of FIG. 11 is used. This hybrid scheme offers a tradeoff between beamforming capability and size, footprint, and cost of electronic components. Furthermore, subarray implementation of an optical phased array provides a scalable solution and facilitates systematic array calibration.

Applications

Optical phased arrays may be used in various applications including, but not limited to, optical communications, optical imaging, optical ranging, and optical sensing.

Figure 17:
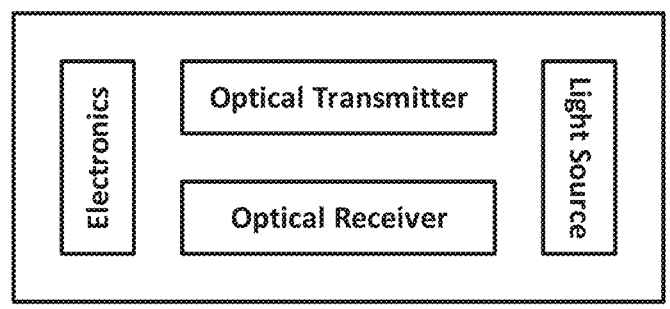
FIG. 17 shows a generic optical system, utilizing optical phased array that includes all or a subset of optical transmitter, optical receiver, light source (e.g., laser, light emitting device, etc.), and electronics.

Referring to FIG. 17, a generic optical system, utilizing optical phased array, may include all or a subset of optical transmitter, optical receiver, light source (e.g., laser, light emitting device, etc.), and electronics. In this system, either one or both of the optical transmitter and optical receiver may be an optical phased array, such as any of the optical phased arrays disclosed herein, and/or illustrated in FIGS. 5-16. The optical transmitter and optical receiver may share some of the components or may not share any component.

In one application, an optical system including an optical phased array may be used to create one or more directional links for free-space communication between two or more points. In other applications, an optical system including an optical phased array may be used for sensing, imaging, or ranging. For instance, such optical systems may be used to realize imagers for cars, drones, planes, robots, industrial setups, or consumer products such as smartphones.

Further, optical phased arrays may be used in 3D imaging systems. In one embodiment, the imaging system may include an optical phased array transmitter and an optical phased array receiver. For instance, the optical phased array transmitter may create a narrow beam that is scanned electronically. The reflected or scattered signals are then collected by a phased array receiver that may follow any of the aforementioned architectures.

In an alternative embodiment, the transmitter is not a phased array. For instance, the transmitted signal may impinge on the entire field-of-view. The reflected or scattered signals are then collected by a phased array receiver that may follow any of the aforementioned architectures.

Figure 18:
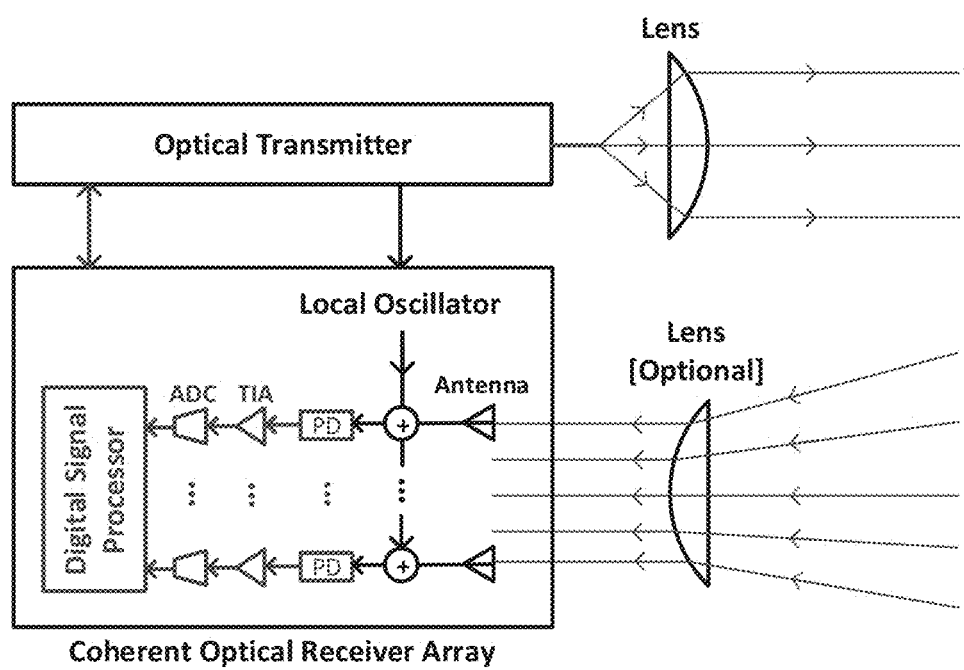
FIG. 18 shows a schematic of a coherent flash 3D imager according to an embodiment of the present disclosure.

FIG. 18 shows an example of a 3D imager where a transmit signal impinges on the entire field of view, and a coherent receiver array collects the reflected or scattered signals. An optical lens may or may not exist at the receiver or the transmitter. This scheme may be referred to as a coherent flash 3D imager. The advantages of such a coherent flash 3D imager versus conventional time-of-flight flash 3D imagers are more resiliency to ambient light (background noise) and interference. Furthermore, realization of the receiver as an optical phased array removes the requirement for an optical lens, and enables controllable field-of-view and resolution (as opposed to a fix resolution and field of view in conventional time-of-flight flash 3D imagers).

Implementations

Optical phased arrays may be implemented monolithically or heterogeneously using one or more semiconductor substrates. For instance, an optical phased array may be realized using a silicon photonics technology. Alternatively, an optical phased array may be realized using a compound semiconductor technology such as InP. Alternatively, some of the devices in an optical phased array may be realized using silicon technology while some other devices may be realized using compound semiconductors such as InP. Various packaging techniques may be used to integrate and package an optical phased array.

In one embodiment, the entire optical phased array, including all photonic and electronic components, may be realized in a single semiconductor substrate.

Figure 19:
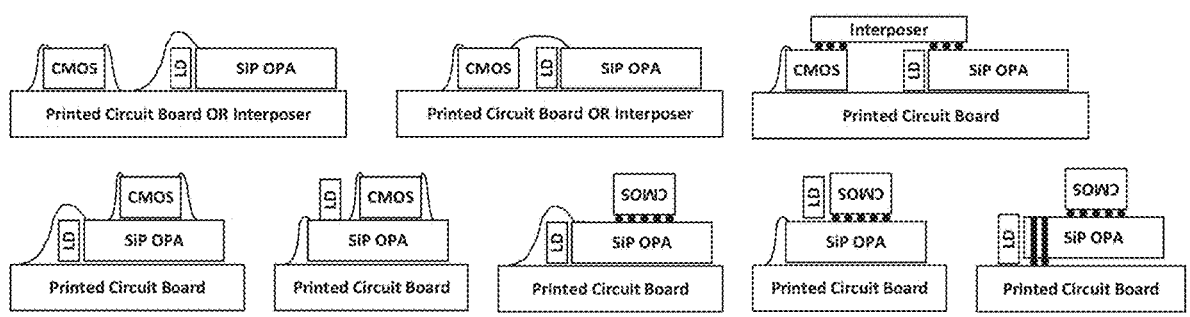
FIG. 19 shows representative approaches for integrating or packaging an optical phased array system that includes a silicon photonics (SiP) optical phased array (OPA), a CMOS chip, and a laser diode (LD).

In an alternate embodiment, the photonic and electronic components of a phased array may be realized in separate semiconductor substrates. As a special case, the photonic components of a phased array may be realized using a silicon photonic (SiP) process in one chip whereas the electronic components may be realized on a CMOS process in another chip, and the laser diode (LD) may be realized using another semiconductor substrate which may be packaged. A number of approaches may be used to integrate or package multiple components of a phased array some of which are shown in FIG. 19.

An optical phased array may be realized in a single chip if the process enables integration of photonic and electronic components. The advantage of this approach is more compact realization and simpler packaging. Alternatively, an optical phased array may consist of two chips dedicated to photonic and electronic functions separately. This approach requires more complex packaging scheme and consume larger footprint. But, it provides more flexibility in adopting the suitable semiconductor platforms for the realization of photonic and electronic functions. A generic electronic integrated circuit that includes a large number of drivers, with controllable current/voltage levels, to control the variable optical phase shifters and variable optical amplitude adjusters of an optical phased array photonic integrated circuit will be quite useful. A generic electronic integrated circuit for controlling a wide range of optical phased arrays can also be used.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An optical phased array receiver comprising:
a set of antennas, each antenna configured to receive an optical signal;
a set of optical variable phase shifters, each optical variable phase shifter configured to adjust the phase of the one or more of the received optical signals;
a set of optical variable amplitude adjusters, each optical variable amplitude adjuster configured to adjust the amplitude of the one or more of the received optical signals;
a local oscillator configured to generate an optical carrier signal;
one or more optical signal combiners coupled to the set of antennas and the local oscillator, the one or more optical signal combiners configured to combine (i) the optical signals received by the antennas and (ii) the optical carrier signal; and
one or more photodetectors configured to extract information carried by one or more of the received optical signals into an electrical signal,
wherein the extracted information is indicative of a phase and an amplitude of the one or more of the received optical signals, wherein the one or more optical signal combiners comprise:
a first optical signal combiner configured to combine the phase and the amplitude adjusted received optical signals into a combined received optical signal; and
a second optical signal combiner configured to combine the combined received optical signal and the optical carrier signal, and
wherein the one or more photodetectors comprise a photodetector coupled to the second optical signal combiner and configured to generate the electrical signal that is indicative of the phase and the amplitude of one or more of the received optical signals.

2. The optical phased array receiver of claim 1, further comprising:
an analog to digital converter configured to convert an analog electrical signal to a digital signal; and
a digital signal processor configured to process the digital signal.

3. The optical phased array receiver of claim 1, further comprising:
smaller subarrays, wherein each subarray comprises a set of antennas, a set of optical variable phase shifters, a set of optical variable amplitude adjusters;
a signal optical combiner configured to combine the phase and amplitude adjusted received optical signals within the subarray into a combined received optical signal, and a photodetector configured to generate an analog electrical signal that is indicative of the phase and the amplitude of one or more the received optical signals in the corresponding subarray; and
a signal splitter configured to split the optical carrier signal into one or more optical carrier signals to be coupled to each of the subarrays.

4. An optical phased array receiver comprising:
a set of antennas, each antenna configured to receive an optical signal;
a local oscillator configured to generate an optical carrier signal;
an optical signal splitter configured to split the optical carrier signal into a plurality of optical carrier signals;
a set of optical variable phase shifters, each optical variable phase shifter configured to adjust either the phase of a corresponding one of the plurality of optical carrier signals or the phase of a corresponding received optical signal;
one or more optical signal combiners coupled to the set of antennas and the local oscillator, the one or more optical signal combiners configured to combine (i) the optical signals received by the antennas and (ii) the optical carrier signal; and
one or more photodetectors configured to extract information carried by one or more of the received optical signals into an electrical signal,
wherein the extracted information is indicative of a phase and an amplitude of the one or more of the received optical signals, and
wherein each of the optical signal combiners is configured to combine: the (i) phase adjusted optical carrier signal and (ii) corresponding received optical signal;
or the (i) phase adjusted received optical signal and (ii) corresponding optical carrier signal;
or the (i) phase adjusted received optical signal and (ii) corresponding phase adjusted optical carrier signal.

5. The optical phased array receiver of claim 4, further comprising:
an analog to digital converter configured to convert an amplified signal to a digital signal; and
a digital signal processor configured to process the digital signal.

6. The optical phased array receiver of claim 4, further comprising:
one or more variable amplitude adjusters, wherein each variable amplitude adjuster is configured to adjust the amplitude of the received optical signal or the optical carrier signal or a combined optical signal.

7. The optical phased array receiver of claim 4, wherein the optical phased array receiver is divided into smaller subarrays, each subarray comprising the set of antennas, the set of optical variable phase shifters, the set of photodetectors, and the analog to digital converter.

8. An optical phased array receiver comprising:
a set of antennas, each antenna configured to receive an optical signal;
a local oscillator configured to generate an optical carrier signal;
an optical signal splitter coupled to the local oscillator and configured to split the optical carrier signal into a plurality of optical carrier signals;
one or more optical signal combiners coupled to the set of antennas and the local oscillator, the one or more optical signal combiners configured to combine (i) the optical signals received by the antennas and (ii) the optical carrier signal;
one or more photodetectors configured to extract information carried by one or more of the received optical signals into an electrical signal,
wherein the extracted information is indicative of a phase and an amplitude of the one or more of the received optical signals,
wherein each of the optical signal combiners, coupled to the optical signal splitter and a corresponding one of the set of antennas, is configured to combine (i) one of the plurality of optical carrier signals and (ii) the optical signal received by the corresponding one of the antennas, and
wherein each of the photodetectors coupled to the corresponding one of the optical signal combiners is configured to extract the information carried by the one or more received optical carrier signals into an analog electrical signal; and one or more analog to digital converters configured to convert the analog electrical signals into one or more digital signals, the one or more digital signals being indicative of the phase and the amplitude of one or more of the received optical signals; and a set of electrical variable phase shifters, wherein each electrical variable phase shifter is configured to adjust a phase of an analog electrical signal that corresponds to a photodetector prior to the analog to digital conversion.

9. The optical phased array receiver of claim 8, wherein the optical phased array receiver is divided into smaller subarrays, each subarray comprising a set of antennas coupled to the optical signal splitter coupled to the local oscillator, a set of photodetectors, a set of electrical variable phase shifters, and an analog to digital converter.

10. The optical phased array receiver of claim 8, wherein the optical phased array receiver is divided into smaller subarrays, each subarray comprising a set of antennas coupled to the optical signal splitter coupled to the local oscillator, one or more photodetectors, and an analog to digital converter.

* * * * *